US012561876B2

(12) United States Patent
    Obukhov et al.

(10) Patent No.: US 12,561,876 B2
(45) Date of Patent: Feb. 24, 2026

(54) SYSTEM AND METHOD FOR AN AUDIO-VISUAL AVATAR CREATION

(71) Applicants: Constructor Technology AG, Schaffhausen (CH); Constructor Education and Research Genossenschaft, Schaffhausen (CH)

(72) Inventors: Dmitriy Obukhov, Istanbul (TR); Marcel de Korte, Stockholm (SE); Denis Parkhomenko, Moscow (RU); Ivan Kirillov, Moscow (RU); Alexey Rybak, Istanbul (TR); Laurent Dedenis, Singapore (SG); Serg Bell, Singapore (SG); Stanislav Protasov, Singapore (SG)

(73) Assignees: Constructor Technology AG, Schaffhausen (CH); Constructor Education and Research Genossenschaft, Schaffhausen (CH)

( * ) Notice: Subject to any disclaimer, the term of this patent is extended or adjusted under 35 U.S.C. 154(b) by 93 days.

(21) Appl. No.: 18/059,377

(22) Filed: Nov. 28, 2022

(65) Prior Publication Data

US 2024/0177386 A1 May 30, 2024

(51) Int. Cl.
    *G06T 13/20* (2011.01)
    *G06F 40/284* (2020.01)
    (Continued)

(52) U.S. Cl.
    CPC .......... *G06T 13/205* (2013.01); *G06F 40/284* (2020.01); *G06T 13/40* (2013.01);
    (Continued)

(58) Field of Classification Search
    CPC ..... G06T 13/205; G06T 13/40; G06F 40/284; G10L 2021/105; G10L 13/10; G10L 13/047; G10L 13/0335
    See application file for complete search history.

(56) References Cited

U.S. PATENT DOCUMENTS 11,132,913 B1 * 9/2021 Ramanarayanan .. G06V 40/174
11,218,666 B1 1/2022 Haas et al.
            (Continued)

FOREIGN PATENT DOCUMENTS

CN    110688911 B    4/2021
CN    113900522 A    1/2022
            (Continued)

OTHER PUBLICATIONS

K R Prajwal, et al. A Lip Sync Expert Is All You Need for Speech to Lip Generation In The Wild, Aug. 23, 2020, 2008.10010.pdf.
            (Continued)

*Primary Examiner* — Weiming He
(74) *Attorney, Agent, or Firm* — ESPE Legal Consultancy FZ-LLC

(57) ABSTRACT

The present disclosure relates to an avatar generator to generate an audio-visual avatar specific to an application, such as tutoring. The avatar generator includes a general synthesizer to receive a training dataset. The general synthesizer includes a voice synthesis module and a video synthesis module trained by the training dataset. The avatar generator includes a customized synthesizer consisting of a voice custom synthesis module and a video custom synthesis module trained on the audio-video samples of the target person. The avatar generator further includes a video generator to create an audio-visual avatar and is configured to synthesize a voice clone using an input text, process the voice clone, synthesize a video clone based on the video
            (Continued)

synthesis module and the video custom synthesis module, and apply the voice clone to the video clone.

20 Claims, 12 Drawing Sheets

(51) Int. Cl.
| | |
|---|---|
| *G06T 13/40* | (2011.01) |
| *G10L 13/033* | (2013.01) |
| *G10L 13/047* | (2013.01) |
| *G10L 13/10* | (2013.01) |

(52) U.S. Cl.
CPC ........ *G10L 13/0335* (2013.01); *G10L 13/047* (2013.01); *G10L 13/10* (2013.01); *G10L 2013/105* (2013.01)

(56) References Cited

U.S. PATENT DOCUMENTS

| | | | |
|---|---|---|---|
| 2018/0336713 A1 | 11/2018 | Avendano et al. | |
| 2019/0095775 A1* | 3/2019 | Lembersky | ............ G06N 3/006 |

| | | | | |
|---|---|---|---|---|
| 2020/0380952 A1* | 12/2020 | Zhang | .................... | G10L 13/047 |
| 2021/0174093 A1* | 6/2021 | Li | .......................... | G06N 3/045 |
| 2022/0335971 A1* | 10/2022 | Gruszka | ................ | G10L 15/005 |
| 2024/0054711 A1* | 2/2024 | Sima | ....................... | G06V 40/20 |
| 2024/0303892 A1* | 9/2024 | Zhang | ..................... | G10L 13/00 |
| 2024/0355346 A1* | 10/2024 | Lubin | ..................... | G10L 17/02 |

FOREIGN PATENT DOCUMENTS

| | | | |
|---|---|---|---|
| CN | 114332315 A | | 4/2022 |
| KR | 102236718 B1 | | 4/2021 |
| WO | WO2021073416 A1 | | 4/2021 |
| WO | WO-2023207541 A1 | * | 11/2023 |

OTHER PUBLICATIONS

Fitsum Reda, et al. FILM: Frame Interpolation for Large Motion, 2202.04901.pdf.

Akshay Raina, et al. SyncNet: Using Causal Convolutions and Correlating Objective for Time Delay Estimation in Audio Signals, Apr. 20, 2022, 2203.14639.pdf.

* cited by examiner

Method 900 configuring a synthesis module by collecting an audio training dataset 120 and a video training dataset, training a voice synthesis model of the synthesis module based on the audio training dataset, and training a video synthesis model of the synthesis module based on the video training dataset 902 configuring a customized synthesis module characterizing a target person by receiving an audio sample of the target person 122 and training a voice custom synthesis model based on the audio sample and receiving a video sample of the target person 124 and training a video custom synthesis model based on the video sample 904 creating, using a video generator 106, an audio-visual avatar by receiving text to be converted into an audio clip and synthesizing a voice clone from the text by means of the voice synthesis model and the voice custom synthesis model, processing the voice clone to be formatted by phrases and expressions, and synthesizing a video clone based on the video synthesis model and the video custom synthesis model, applying the voice clone to the video clone for creating the audio visual avatar by the video generator 106 906

Figure 9

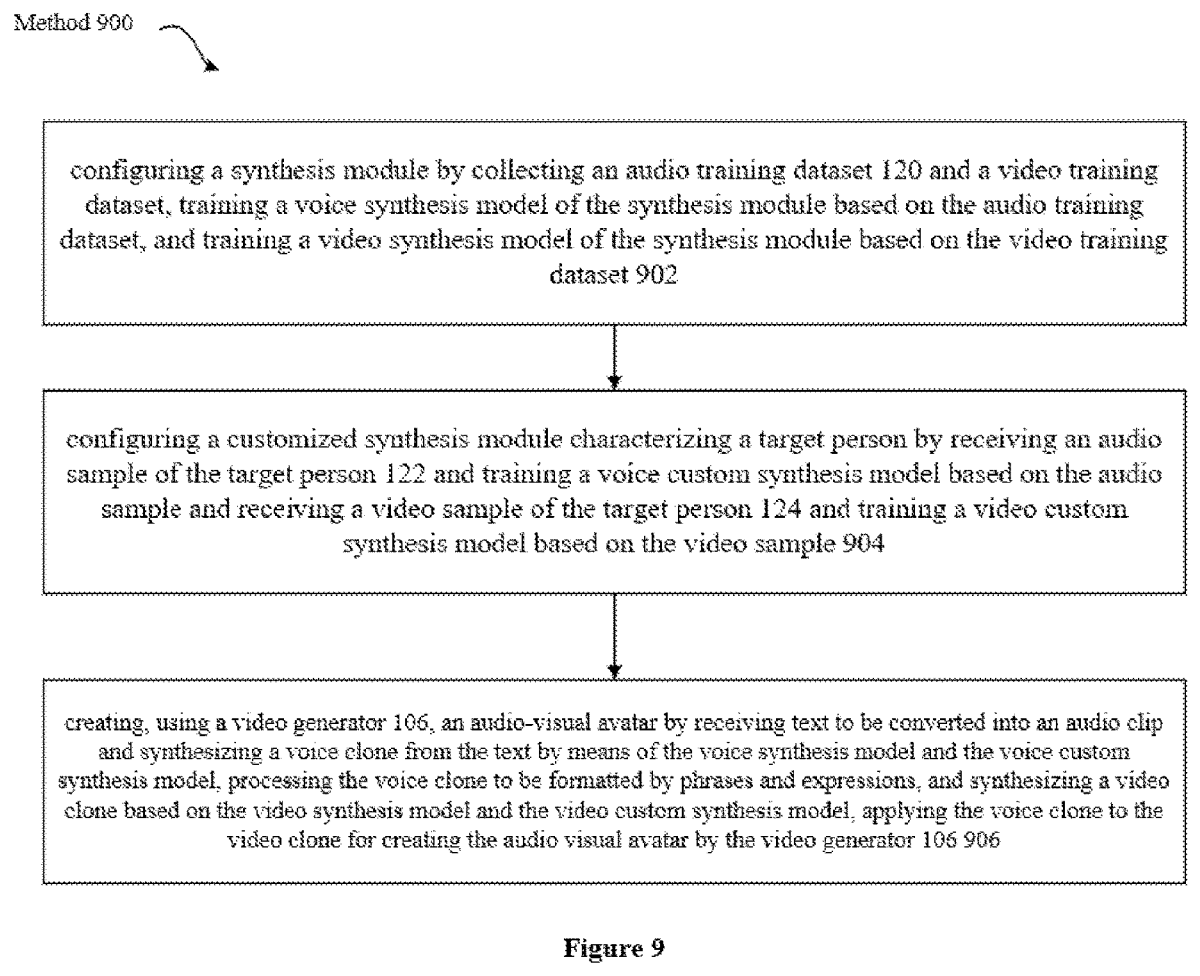

SYSTEM AND METHOD FOR AN AUDIO-VISUAL AVATAR CREATION

FIELD OF THE INVENTION

The present disclosure generally relates to an audio-visual avatar creation. In particular, the present disclosure relates to a system and method for creating controllable audio-visual avatars with a high level of naturalness for a specific application.

BACKGROUND OF THE INVENTION

Virtual Reality (VR) or Augmented Reality (AR) environments are playing a crucial role in various applications. For example, some applications will allow users to play games in a VR environment offering a virtual reality experience to the users. Some applications allow users to interact with impersonated virtual objects designed in three-dimensional graphical environments for offering the user an interactive experience. There are numerous software applications that are available currently, which can create such virtual objects in an interactive environment. The conventional software applications implement different methods and interfaces to create virtual objects in an avatar format, i.e., a virtual personality in an interactive environment, for example, a tutor delivering a lecture in a virtual classroom.

Some applications allow a single input, may be in text format, which can be converted into a speech representation of the virtual avatar. To make the environment more interactive, some applications may allow multiple input modes, such as multimode interfaces (MMIs). MMIs are configured to process one or more input modes to allow the user to utilize text input, speech input, physical gesture inputs, or any possible combination of such inputs. For example, to create a virtual avatar of a tutor, a user may provide text input or a speech input, physical gestures, such as hand gesture or a posture, and a background environment.

Virtual avatars created for any application, may it be for a gaming purpose or tutoring applications, would be more convincing if they are produced with high proximity to natural looks and sounds. Moreover, the virtual avatars created for interactive environments may render better user experience, if lag in creation of any dialogue, gesture, or any reaction in response to user's input can be kept minimal. However, production of a virtual avatar of a specific target person with natural looks and sound has been a challenge. Developing an arbitrary avatar itself can be challenging and time-consuming. For avatar creation, a programming code must be developed for receiving and processing humongous input data received from multiple input sources. Receiving multiple inputs from multiple sources and processing the entire data can be difficult and time-consuming for a developer as well. In addition to the processing, perfect quality of the avatar remains a difficult challenge as issues, such as controlling voice cloning quality, visual attractiveness, and body cloning of a target person invite computational complexities.

Therefore, there is a need for a system and method for designing controllable avatar with high levels of natural appearance, less complex in terms of computation, economic, time-efficient, having realistic look and sound, and that can be utilized for automating specific applications, such as in tutoring applications.

SUMMARY OF THE INVENTION

The present disclosure describes a method for implementing an avatar generator. The method is implemented in a training phrase, a customization phase, and an avatar-creation phase. The method comprises a step of configuring a synthesis module by collecting an audio training dataset and a video training dataset, training a voice synthesis module of the synthesis module based on the audio training dataset, training a video synthesis module of the synthesis module based on the video training dataset.

The method further comprises a step of configuring a customized synthesis module characterizing a target person by receiving an audio sample of the target person and training a voice custom synthesis module based on the audio sample, receiving a video sample of the target person, and training a video custom synthesis module based on the video sample.

The method further comprises a step of creating, using a video generator, an audio-visual avatar by: receiving text to be converted into an audio clip and synthesizing a voice clone from the text by means of the voice synthesis module and the voice custom synthesis module, processing the voice clone to be formatted by phrases and expressions, and synthesizing a video clone based on the video synthesis module and the video custom synthesis module, applying the voice clone to the video clone for creating the audio visual avatar by the video generator.

In some embodiments, the method comprises a step of synthesizing the video clone of the target person includes synthesizing a head cloning and a body cloning. The head cloning includes controlled synthesizing of lips movements and facial gestures. The body cloning further includes hand gestures and body postures relating to the target person.

In some embodiments, the step of the body cloning is implemented by training a video generator using the video sample of the target person, fetching a body movement script, and applying the body movement script to the video generator to generate a video with body cloning characteristics.

In some embodiments, the step of the head cloning is configured for training the video generator using the video sample of the target person, fetching a face movement script, and applying the face movement script to the video generator to generate a video with head cloning characteristics.

In some embodiments, the step of training the synthesis module comprises implementing an end-to-end model that further comprises a generator, a discriminator, a text encoder, a duration predictor, a latent encoder, and a posterior encoder.

In some embodiments, the step of the training the synthesis module comprises implementing a two-step model which includes an acoustic module and a vocoder module.

In some embodiments, the step of configuring the acoustic module comprises receiving a text representation by an encoder module and producing an encoded representation of the textual content, receiving the encoded representation by a pitch prediction module and returning an encoded pitch representation that can be modified by a user, wherein the encoded pitch representation is added to the encoded representation to produce an enhanced encoded representation, receiving the encoded representation by a duration prediction module and returning a prediction of the number of repetitions with which each encoded representation should be upsampled, and receiving an upsampled encoded representation by a decoder and returning a spectral acoustic representation.

In some embodiments, the step of synthesizing the voice clone is characterized by controlled speech characteristics, and comprises pre-processing input text for formatting, normalization, phonetization, extraction of special tokens providing additional control, transforming text-to-audio by applying the voice synthesis module to the input text and formatting the input text converted into an audio representation, and post-processing the audio representation.

In some embodiments, the step of creating the audio-visual avatar comprises combining an acoustic speech recognition, dialog manager, and natural language processing for controllable avatar.

In some embodiments, the step of creating the audio-visual avatar comprises training and applying refinement model to output of the video generator.

The present disclosure, in an alternative embodiment, describes an avatar generator to generate an audio-visual avatar specific to an application. The avatar generator comprises a synthesis module to receive an audio training dataset and a video training dataset. The synthesis module further comprises a voice synthesis module trained by the audio training dataset; a video synthesis module trained by the video training dataset. The avatar generator further comprises a customized synthesis module, characterizing a target person, to receive an audio sample and a video sample of the target person. The customized synthesis module comprises a voice custom synthesis module trained on the audio sample of the target person and a video custom synthesis module trained on the video sample of the target person. The avatar generator further comprises a video generator to create an audio-visual avatar configured to receive, by a voice cloning system, input text to be converted into an audio clip, synthesize a voice clone, by voice cloning system, from the input text by means of the voice synthesis module and the voice custom synthesis module, process, by the voice cloning system, the voice clone to be formatted by phrases and expressions, synthesize a video clone, by a video cloning system, based on the video synthesis module and the video custom synthesis module, apply the voice clone to the video clone for creating the audio visual avatar by the video generator.

DESCRIPTION OF THE DRAWINGS

FIG. 9 depicts a method for implementing an avatar generator, in accordance with one implementation of the present embodiment.

DETAILED DESCRIPTION

The invention concerns a target person who engages in a specific activity or role. A target person is virtually cloned to create an avatar that is suitable for the target person's activity or role. An audio-visual avatar is created for a particular application.

Figure 1:
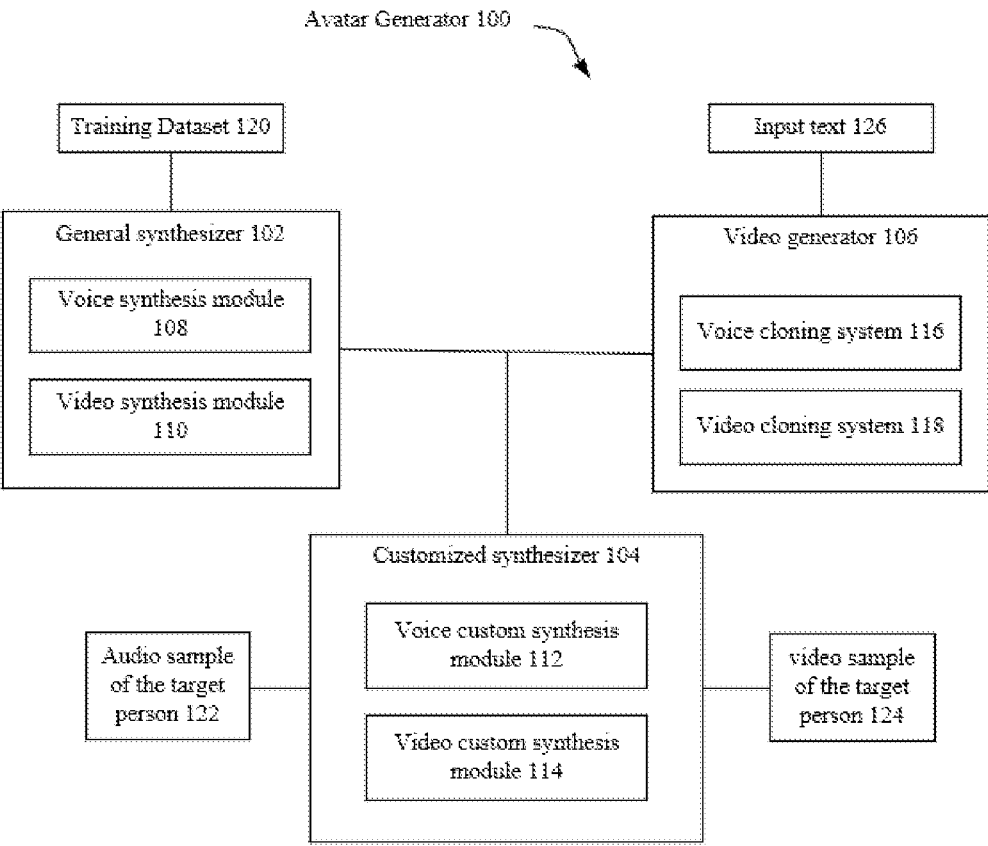
FIG. 1 is a block diagram of an avatar generator, in accordance with one implementation of the present embodiment.

FIG. 1 is a block diagram of an avatar generator 100, in accordance with one implementation of the present embodiment. The avatar generator 100 is implemented to create a controlled avatar in phases. The first phase is a training phase, implemented by a general synthesizer 102. The second phase is an inference phase where customization of a target person character is achieved, and the avatar of the target person is created based on the trained general synthesizer 102 and the customization of the target person character.

The avatar generator 100 comprises a general synthesizer 102, a customized synthesizer 104, and a video generator 106. The general synthesizer 102 is configured to receive a training dataset 120 relating to arbitrary objects and based on the training dataset, synthesize a voice synthesis module 108 and a video synthesis module 110. The training dataset may be voice recordings, audio clips, audio recordings, video clips, visuals, video frames, and so on. The datasets may be collected from open data sources. For example, a training dataset 120 can be a video of a lecture delivered by a professor downloaded from a university website. The speaker in the video may not be a target person. Instead, the speaker is a person whose audio and video will be processed and fragmented in order to train deep neural networks for extracting and segregating various characteristics of the videos, such as gestures, phrases, movements, and the like.

In an embodiment, the training data includes an audio training dataset 120 representing voice training data and a video training dataset 120 representing video training data. According to one implementation, the audio training dataset 120 is provided to the voice synthesis module 108, and the video training dataset 120 is provided to the video synthesis module 110. The voice synthesis module 108 is configured to divide the audio training data into phenomena or phrases with characteristic expressions. The video synthesis module 110 is configured to divide the video training data into frames or sequences of frames corresponding to a certain phenomenon or phrase or expression. The video synthesis module 110 imparts modulation of physical appearance and associated characteristics including lip movements, body movements fractionated as head and torso movements, and aggregated movements of the body and lips. The video synthesis module 110, therefore, includes a lip movement module to extract lip movements from the video training data, a body movement module to extract head and torso movements from the video training data, and an aggregation module to extract aggregated movements of the body and lips.

In accordance with one embodiment, the customized synthesizer 104 is provided to synthesize voice and video of a target person. The customized synthesizer 104 is configured to synthesize voice recordings and video recordings pertaining to the target person by extracting characteristic features from audio and video samples. The audio samples 122 of the target person are provided to a voice custom synthesis module 112 to divide the audio samples 122 into frames or sequences of frames corresponding to a certain phenomenon or phrase or expression so that the synthesized audio will incur the controlled speech characteristics as that of the target person. The video samples of the target person are provided to a video custom synthesis module 114 to divide the video samples into frames or sequences of frames corresponding to a certain phenomenon or phrase or expression so that the synthesized video will have the physical characteristics of the target person. In one example, the target person can be a tutor or a lecturer delivering a lecture at home or in a personal working space.

In accordance with one embodiment, the video generator 106 is configured to generate an audio-visual avatar based on the general synthesizer 102 and a customized synthesizer 104. The video generator 106 comprises a voice cloning system 116 to create a voice clone of the target person and a video cloning system 118 to create a video clone imposed with the voice clone of the target person. According to one implementation, an input text 126 is provided to the video generator 106 as an input. The input text 126 is received from a user. Alternatively, the input may be from another source, such as downloaded document or prewritten text. The input text 126 comprises words, a group of words in format of the sentence, phrases, and word clusters with applied grammatical expressions that must be spoken by the audio-visual avatar. In one example, the input text 126 can be a chapter from a textbook that has to be spoken by a tutor for teaching the chapter to the student. In another example, the input text 126 can be a text portion of a peer-reviewed paper downloaded from the Internet in response to answering a question raised by a student. The tutor may then read and speak the text portion to answer the question in an interactive environment.

The input text 126, in one implementation, is converted into speech by the voice cloning system 116 to create a voice clone. The voice cloning system 116 includes a text-to-speech service configured to generate audio data and speech markup data. The audio data can be a speech audio of the input text 126. The audio data may be generated to clone the audio characteristics of the target person and the target person's sound profile, such as a traditional male voice, a traditional female voice, language accent, voice modulation, and average pitch. Other characteristics to be cloned include voice expressions including sadness, excitement, happiness, voice variations and the like. The speech markup data may include certain phenomena such as phonetic symbols, expressions, specific phrases, or time codes. The time codes can be defined as a time of occurrence of the one or more phonetic symbols, phrases, expressions, or words during playback of the audio data.

The video cloning system 118 is configured to generate a video clone of the target person utilizing the video synthesis module 110 and the video custom synthesis module 114 with imposed audio data generated by the voice cloning system 116, in accordance with one implementation. The video cloning system 118 receives synthesized videos from the video synthesis module 110 and the video custom synthesis module 114, extracts the gestures and body movement from the videos, and synthesizes a video clone in accordance with the voice clone. The video clone is a visual representation of three-dimensional graphical content comprising a realistic image of the target person. The graphical content contains features selected based on an aspect of the target's appearance. In one example, the video clone represents the physical appearance of the target person including the target's facial features, skin tone, eye color, hairstyle, and the like. In one example, the video clone includes body posture and body features such as shoulders, neck, arms, fingers, torso, waist, hips, legs, and feet. In one embodiment, the video clone includes only head and neck movements. In another embodiment, the video clone is a full-body representation of the target person including head and body. In one example, the head movements include lip synchronization, facial gestures, or facial expressions. In another example, the body movements include hand gestures, different limb movements, and body postures.

The video custom module is configured to fractionate different physical characteristics. The video recording of the target person is fractionated into different sequences. For example, in one sequence, the facial features are extracted. In another sequence, head and neck movements are extracted. In yet another example, lip movements are extracted. These different sequences are utilized by the video cloning system 118 in accordance with the selected words or phrases to associate the sequences with the selected words or phrases. Thereby generating a video modeling the physical appearance of the target person based on the words or phrases provided as an input. For example, the word "okay" may be associated with physical gestures of thumbs-up where the target person is raising a thumb while other fingers are wrapped up around the palm. The video cloning system 118 uses the thumbs-up gesture from the recorded videos and extracted features to associate it with the word "okay" and generate a video accordingly. The voice cloning system 116 and the video cloning system 118 are described in more detail with reference to subsequent figures of the present disclosure.

Figure 2:
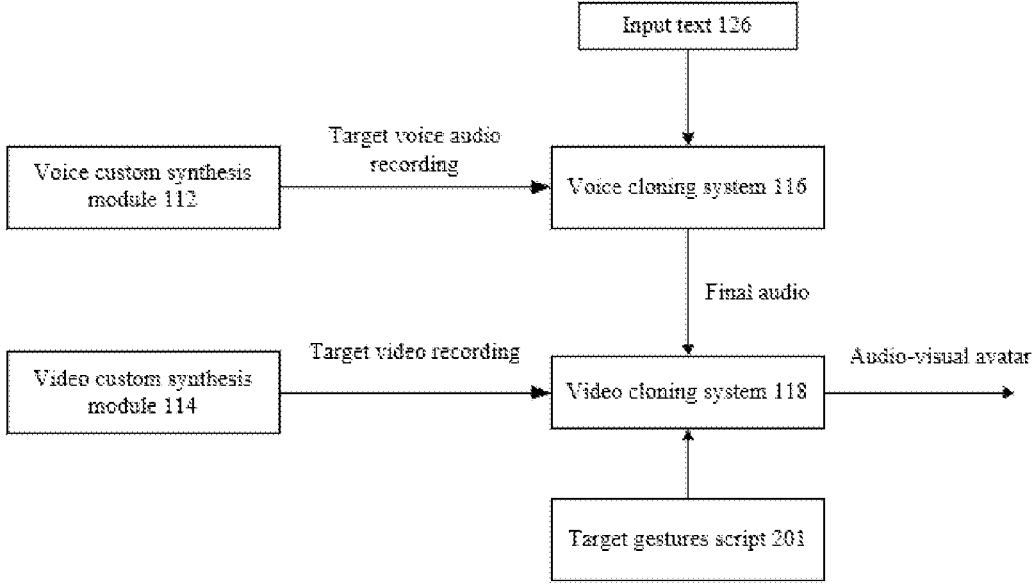
FIG. 2 illustrates a generic block diagram of an inference phase of the audio-visual avatar generation of a target person, in accordance with one implementation of the present embodiment.

FIG. 2 illustrates a generic block diagram of an inference phase of the audio-visual avatar generation of a target person, in accordance with an embodiment. For generating a target-specific clone, audio recordings and video recordings are acquired from the target person. The voice custom synthesis module 112 synthesizes a target person's specific audio recording characterizing the target's voice quality, speech nuances, pitch, energy, and the like. The target voice audio recording is provided to the voice cloning system 116 which also receives the input text 126 to generate a speech from the input text 126 with a voice of the target person. Generated audio is provided to the video cloning system 118. The video custom synthesis module 114 generates different sequences of the visual appearance of the target person based on fractionated characteristics. Such sequences are shared with the video cloning as the target video recordings so that the video cloning system 118 can utilize the sequences based on the input text 126. The final audio of speech is applied to the target video recording based on a target gesture script 201 to generate the avatar. The target gesture script 201 is a set of instructions, readable by the video cloning system 118, relating to target gestures and associated words or phrases from the speech.

Figure 3:
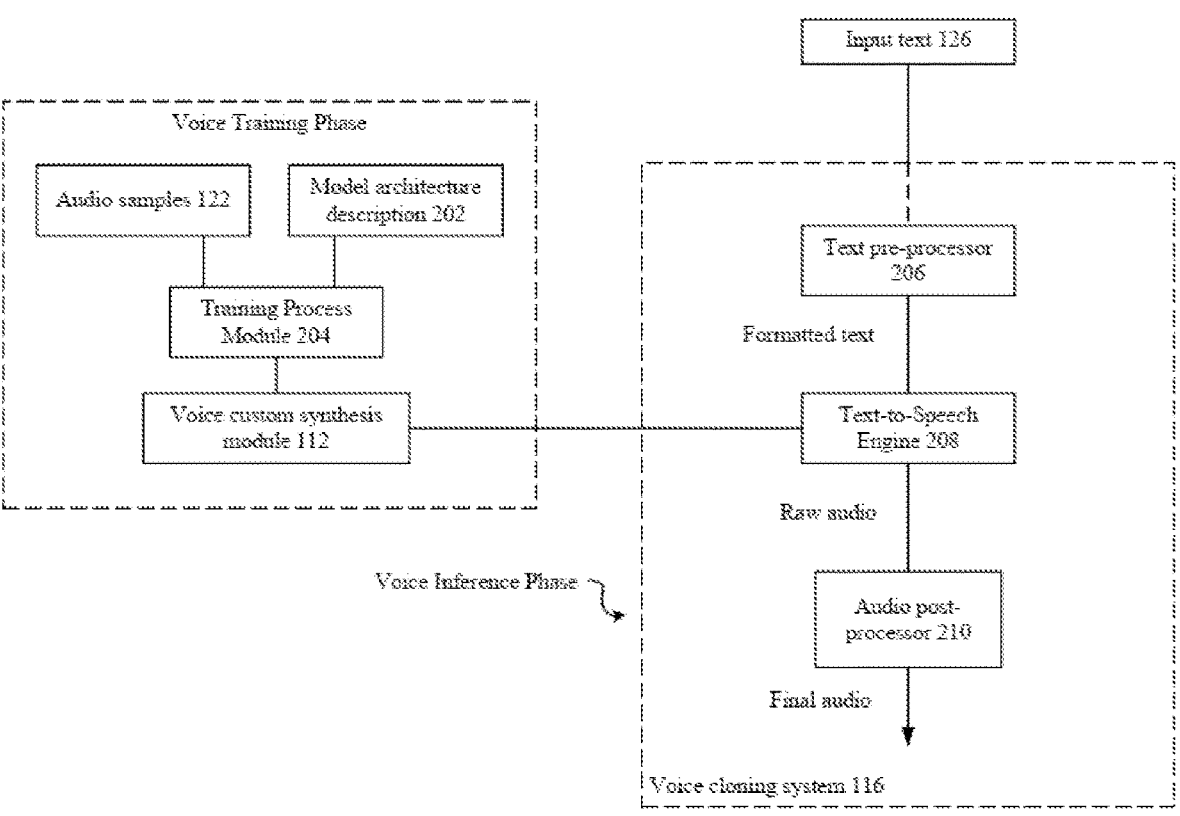
FIG. 3 is a block diagram of voice cloning of the target person, in accordance with one implementation of the present embodiment.
Figure 10:
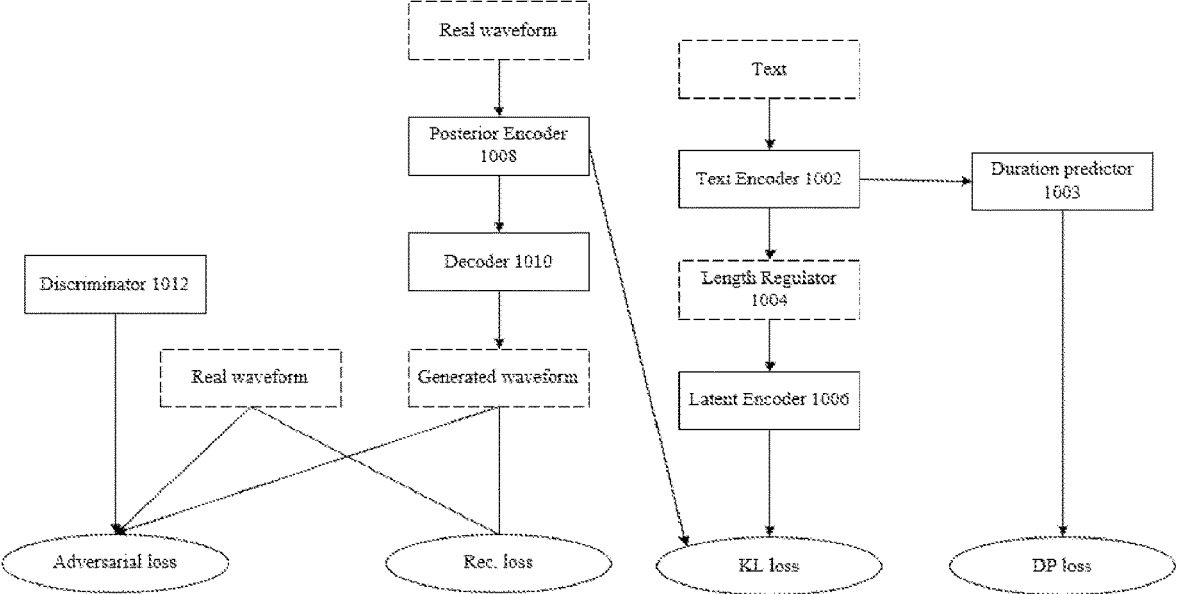
FIG. 10 is a block diagram of an end-to-end model implemented for training the synthesis module and the customized synthesis module, in accordance with one implementation of the present embodiment.
Figure 12:
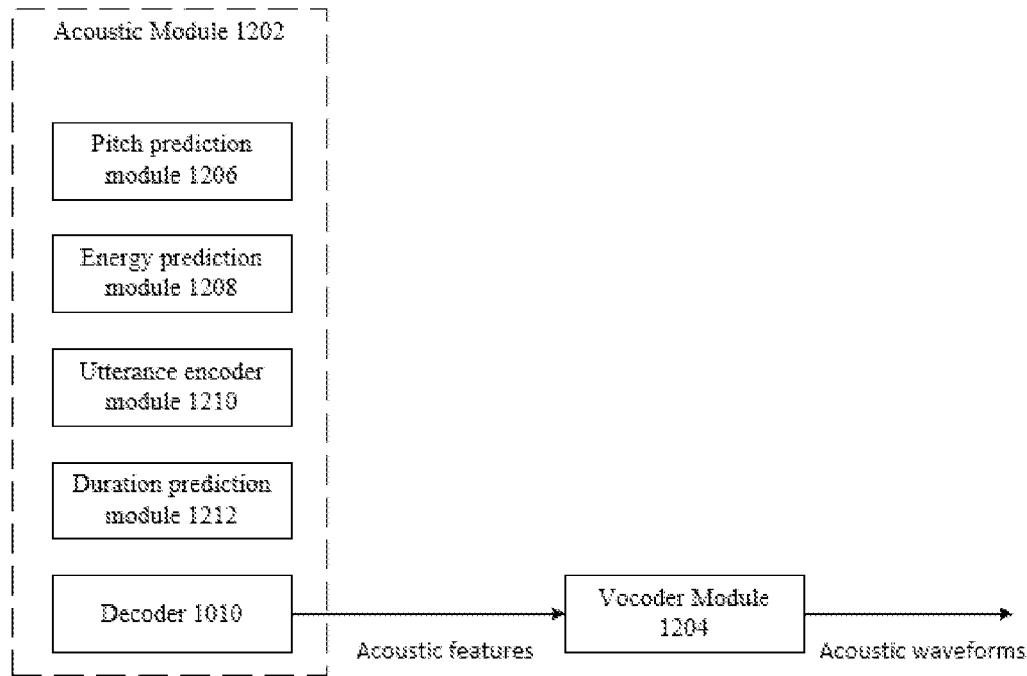
FIG. 12 is a block diagram of a two-step architectural model implemented for training the synthesis module and the customized synthesis module, in accordance with one implementation of the present embodiment.

FIG. 3 is a block diagram of voice cloning of the target person, in accordance with one implementation of an embodiment. The voice cloning of the target person is achieved in two phases, as described earlier with reference to FIG. 1. The first phase is a voice training phase, and the second phase is a voice inference phase. In one implementation, the voice training phase consists of training the voice custom synthesis module 112 to synthesize the voice recordings of the target person. The voice custom synthesis module 112 is trained by a training process module 204. The training process module 204, in one example, may be a processor configured to process multiple inputs in order to recognize the audio characteristics from the audio. In one implementation, two inputs are received by the training process module 204. First the audio samples 122 of the target person, and second, a model architecture description 202. The audio samples 122 of the target person are received from the target person. The audio recordings are, for example, of a duration of zero to one minute. The audio recording is synthesized for various speech characteristics, such as pitch, energy, speaking rate, and the like. The model architecture description 202 is a set of instructions describing and classifying voice characteristics. FIG. 3 shows an exemplary training approach. Alternative training approaches include an end-to-end model and two-step architecture. These approaches are shown in FIG. 10 and FIG. 12.

As shown in FIG. 3, the second phase of the voice cloning is the voice inference phase. The voice cloning system 116 mainly includes a text preprocessor 206, a text-to-speech engine 208, and an audio post-processor 210. The voice cloning system 116 receives the input text 126, which represents the text that must be converted into speech. The input text 126 is received by the text preprocessor 206, in one implementation, which is configured to format the input text 126. The formatting characteristics comprise normalization, phonetization, or extraction of special tokens providing additional controls.

Text pre-processing is used for performing text-to-speech conversion and is performed using data-driven learning networks to improve the accuracy of generating sequences of normalized text for pronunciation. In an embodiment, text normalization of the input text 126 comprising unstructured natural language text includes performing a plurality of steps such as tokenization, feature extraction, classification, and normalization.

In an embodiment, extraction of special tokens renders generation of tokens by processing the input text 126 and includes unstructured natural language text. In some embodiments, the extraction of token includes syntax or semantic analysis of input text 126 and recognizes characters including words, sequences of letters, symbols, punctuation marks, numbers, or digits. Generation of one or more sequences of tokens are based on the recognized characters.

Feature extraction indicates features associated with one or more tokens, such as morphological features, categorical features, or lexical and semantic features associated with the tokens. Classification indicates different types of tasks for normalizing the tokens based on the extracted features and classifying the tokens for indicating such normalization tasks. The input text 126, formatted by the text pre-processing module is provided to the text-to-speech (TTS) engine 208.

The TTS engine 208, in one implementation, is configured to receive the formatted text as an input and convert the text input into a speech output. The TTS engine 208 transforms the input text 126 into normalized speech as if a target person is talking. In an example, the TTS engine 208 provides lifelike voices of arbitrary persons in various languages. In another example, the TTS engine 208 can select a desired sound profile for the voice, including tone, pitch, accents, and so on.

According to an embodiment, the audio post-processing module may be configured in addition to the TTS engine 208 for post-processing of the audio generated by the TTS engine 208. The audio post-processing module is implemented to enhance the audio quality generated by the TTS engine 208.

Figure 4:
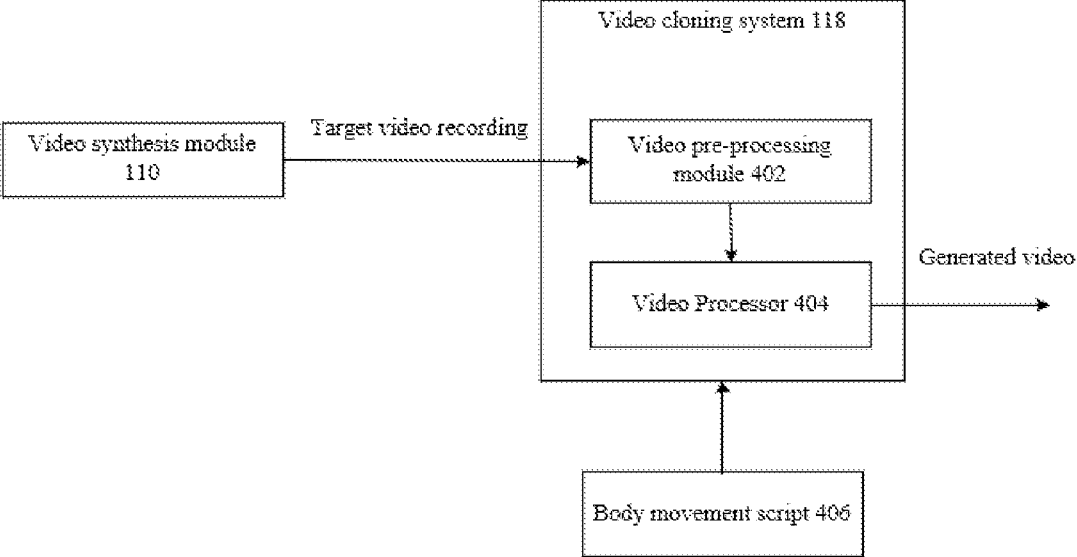
FIG. 4 is a block diagram of body cloning of the target person, in accordance with one implementation of the present embodiment.

FIG. 4 is a block diagram of body cloning of the target person, in accordance with an embodiment. The video cloning of the target person is achieved with a head cloning system and a body cloning system. The body cloning is configured to clone movements of the body parts of the target person. Body cloning creates a realistic video of a target person's full body with the ability to control its movements. In one embodiment, the body cloning can be achieved using a fully generative system. In other embodiments, the body cloning can be achieved using actual recordings of a target person. FIG. 4 describes the approach where body cloning is achieved using real recordings collected from the target person.

The video cloning system 118 comprises a video pre-processing module 402 and a video processor 404. The target video recording based on the actual recordings of the target person and generated by the video custom synthesis module 114 is provided to a video pre-processing module 402. The video pre-processing module 402 receives video recordings from the target person recorded using a predefined script and requirements. The video pre-processing module 402 eliminates the requirement of recording a video in a studio background or environment and allows the target person to shoot the video in an environment using non-professional video-recording equipment. Preprocessed video is then used by the video processor 404 to automatically extract gestures in accordance with a predefined description provided by a body movement script 406. The body movement script 406 is a predefined description for recognizing movement sequences of body parts such as a torso, arms, fingers, shoulder, or legs. The body movement script 406 recognizes the body movement sequences based on the speech or parts of speech, such as specific words or phrases. In view of the body movement script 406, the video processor 404 fetches the body movement sequences from the recorded videos and applies the desired sequences to the speech to create the audio-visual avatar.

Figure 5:
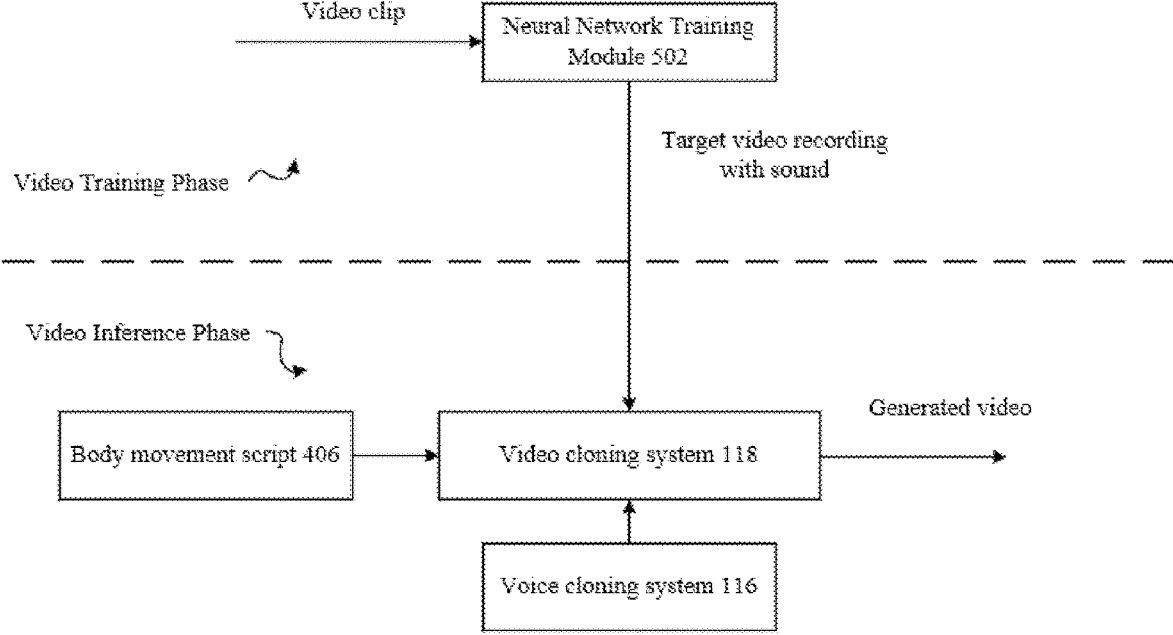
FIG. 5 is a block diagram of body cloning based on a fully generative model, in accordance with one implementation of the present embodiment.

FIG. 5 is a block diagram of body cloning based on a fully generative model, in accordance with an embodiment. As shown in FIG. 5, the fully generative model has a training phase and an inference phase. During the training phase, a video of the target person with full body view is utilized for training a neural network training module 502. In one implementation, the neural network training module 502 is configured to train on visual data fractionated from video recordings of the target person to recognize the body parts, postures, gestures and the like. Body movements of the target person may be segmented and classified into different sequences by the neural network training module 502 to generate a model of the target person. One or more desired model parameters, which are updated based on specified training criteria by the neural network training module 502, are provided to the video cloning system 118 as an input, in one implementation. In the inference phase, in one implementation, the video cloning system 118 is configured to receive the body movement script 406 and the model parameters generated by the neural network training module 502. Based on the body movement script 406, the desired model parameters indicating full body gestures of the target person are extracted. The video of body cloning is then generated using the extracted model parameters.

Figure 6:
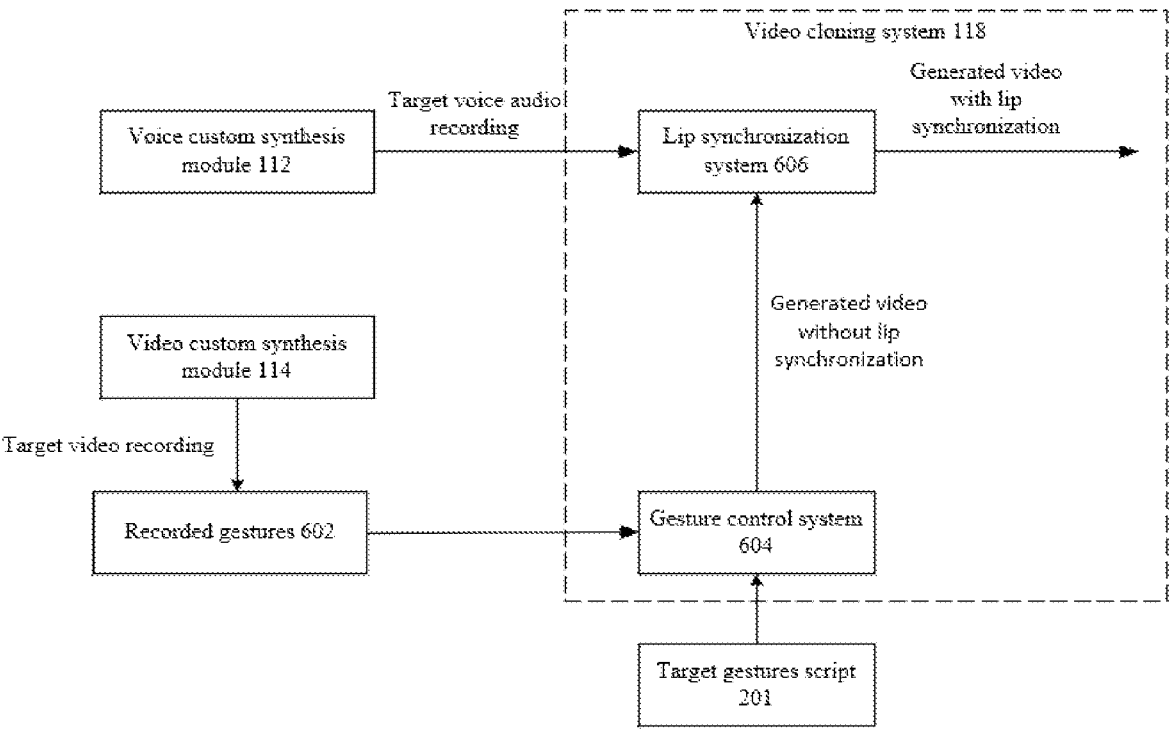
FIG. 6 is a generic block diagram of the video cloning system, in accordance with one implementation of the present embodiment.

FIG. 6 is a generic block diagram of video cloning system 118, in accordance with one implementation of an embodiment. Video cloning comprises two subsystems, referred to as a head cloning system and a body cloning system. FIG. 6 shows a head-cloning system referring to lip synchronization and a gesture-control system. The video cloning system 118 comprises a lip synchronization system 606 and a gesture-control system 604, in accordance with one implementation. In one implementation the video custom synthesis module 114 synthesizes target video recording from which facial gestures are recorded and segregated. The recorded gestures 602 are provided to the gesture control system 604. In one implementation, the gesture control system 604 is provided with a target gesture script 201, including a description and classification of the gestures. Based on the recorded gestures 602 and the target gesture script 201, a video of the head of the target person is generated. This video is generated with controlled gestures but without lip synchronization. The lip synchronization system 606 performs an analysis of the motion of the user's lips as the person speaks the words or phrases. For example, the lip synchronization system 606 may compare the video generated by the gesture control system 604 with a voice recording received from the voice custom synthesis module 112 to match the extent of lip movements with words or phrases spoken by the target person as shown in the video.

Figure 7:
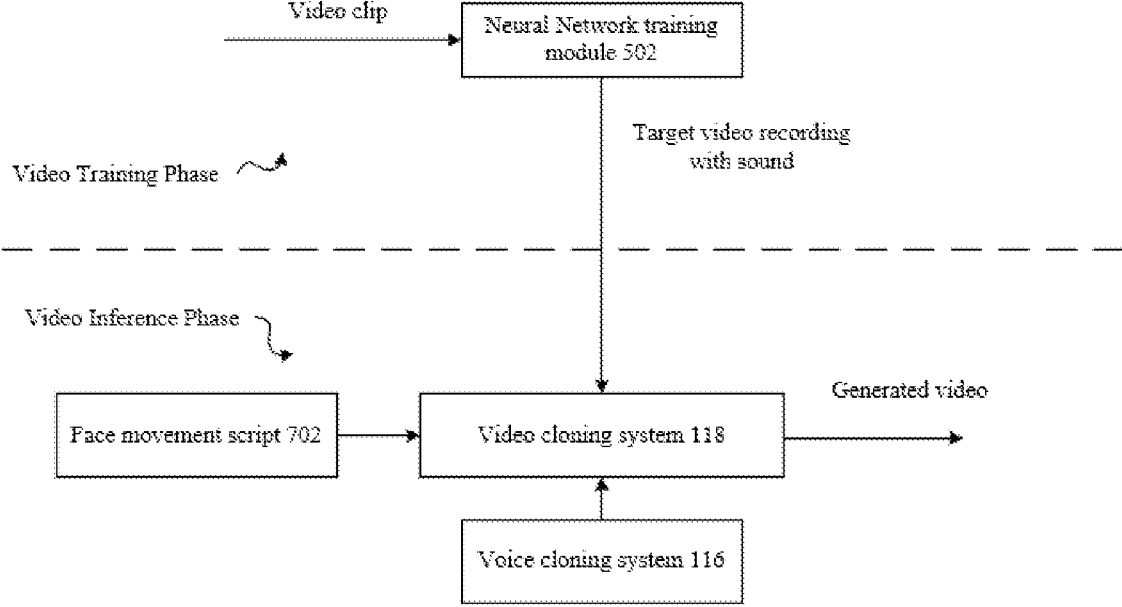
FIG. 7 is a block diagram of head cloning based on a person-specific approach, in accordance with one implementation of the present embodiment.

FIG. 7 is a block diagram of head cloning based on a person-specific approach, in accordance with one implementation of the present embodiment. As shown in the Figure, the body cloning comprises a training phase and an inference phase. During the training phase, a video of the target person with a head view is used for training neural network training module 502 to achieve improved visual quality, naturalness, and audio-visual consistency. In one implementation, the neural network training module 502 is configured to train on visual data fractionated from video recordings of the target person to recognize the facial gestures, and facial embodiments, such as eyes, nose, lip and the like. Facial movements and gestures of the target person are segmented and classified into different sequences by the neural network training module 502 to generate a model of head of the target person. One or more desired model parameters generated by the neural network training module 502 are provided to the video cloning system 118 as an input, in one implementation. In the inference phase, in one implementation, the video cloning system 118 is configured to receive the face movement script 702 and the model parameters generated by the neural network training module 502. Based on the face movement script 702, the desired model parameters indicating the facial gestures of the target person are extracted. The video of head cloning is then generated using the extracted model parameters.

In one embodiment, a head clone is superimposed on a video generated with a full body of an arbitrary person. In one example, the video may be generated with person A and it may have been a prestored video, and according to the speech, a head clone can be generated of a target person. The head clone is superimposed on the body clone of person A. In another embodiment, the head clone is utilized as it is in the video representing just the head and facial gestures of the target person.

Figure 8:
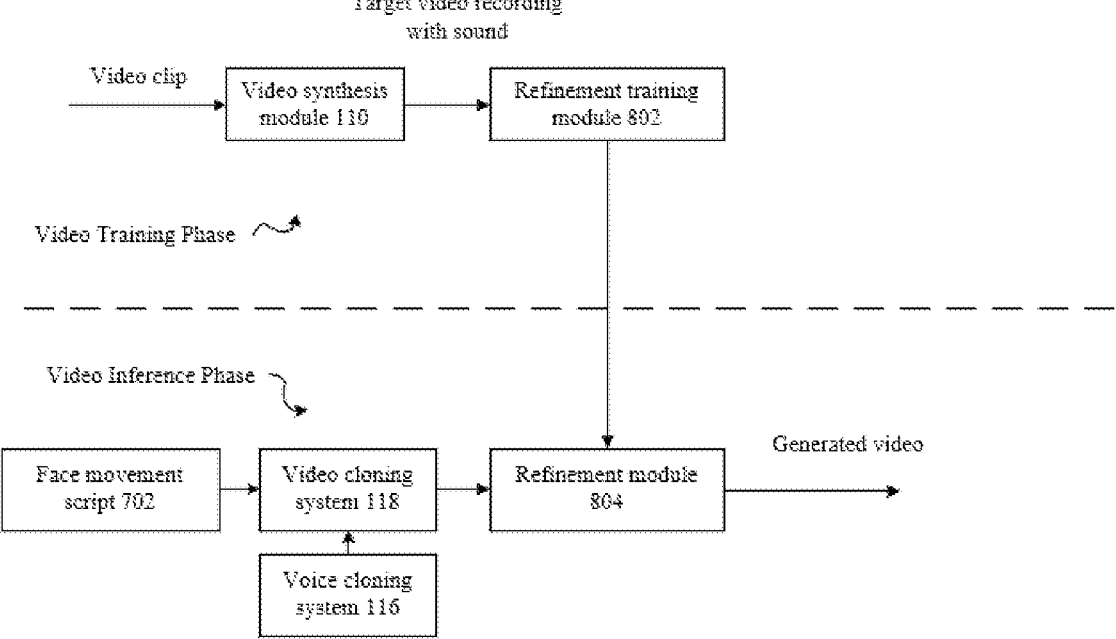
FIG. 8 is a block diagram of face cloning with a video enhancement module, in accordance with one implementation of the present embodiment.

FIG. 8 is a block diagram of face cloning with a video enhancement module, in accordance with an embodiment. The face cloning described is based on a half-person-specific model. The first phase is a main video generation, and a second phase is a refinement of the video. Video synthesis module 110 is configured to provide a target video recording with sound to a refinement training module 802. The refinement training module 802 is a neural network module that can be trained on training data of video recordings and to perform refinement functions to enhance and fine tune the video of the target person. In an alternative embodiment, low-quality video recordings are used. One or more model parameters generated by the refinement training module 802 are then provided to a refinement module 804. The refinement module 804 is configured to receive a video regenerated from video cloning system 118, and on the video one or more model parameters associated with the refinement process are applied to enhance the quality of the video and fine-tune the video.

FIG. 9 depicts a method for implementing an avatar generator 100. In an embodiment, method step 902 includes generating a synthesis module by collecting a training dataset 120 including an audio training dataset and a video training dataset, training a voice synthesis module 108 of the synthesis module based on the audio training dataset, and training a video synthesis module 110 of the synthesis module based on the video training dataset.

In an embodiment, method step 904 includes generating a customized synthesis module 104 characterizing a target person by receiving an audio sample of the target person 122 and training a voice custom synthesis module 112 based on the audio sample of the target person 122 and receiving a video sample of the target person 124 and training a video custom synthesis module 114 based on the video sample of the target person 124.

In an embodiment, the method step 906 includes creating, using a video generator 106, an audio-visual avatar by receiving text to be converted into an audio clip and synthesizing a voice clone from the text by means of the voice synthesis module and the voice custom synthesis module, processing the voice clone to be formatted by phrases and expressions, and synthesizing a video clone based on the video synthesis module and the video custom synthesis module, applying the voice clone to the video clone for creating the audio-visual avatar by the video generator 106.

In some embodiments, the method 900 includes synthesizing the video clone of the target person and generating a head cloning and a body cloning. The head cloning further includes controlled synthesizing of lips movements and facial gestures. The body cloning further comprises hand gestures and body postures relating to the target person.

In some embodiments, the method 900 includes implementing the body cloning system by training a video generator 106 using the video sample of the target person 124, fetching a body movement script 406, and applying the body movement script 406 to the video generator 106 to generate a video with body cloning characteristics.

In some embodiments, method 900 includes implementing the head cloning by training the video generator 106 using the video sample of the target person 124, fetching a face movement script 702, and applying the face movement script 702 to the video generator 106 to generate a video with head cloning characteristics.

In some embodiments, method 900 includes implementing an end-to-end model for training the general synthesizer 102 and the customized synthesizer 104. The end-to-end model further comprises a generator, a discriminator 1012, a text encoder 1002, a duration predictor 1003, a latent encoder, and a posterior encoder 1008. The end-to-end model is described further in connection with FIG. 10.

In some embodiments, the method 900 includes training the general synthesizer 102 and the customized synthesizer 104 by implementing a two-step model including an acoustic module and a vocoder module. The acoustic module and the vocoder module are trained together. In an embodiment, the acoustic module and vocoder module are trained separately.

In some embodiments, the method 900 includes implementing the acoustic module by configuring an encoder module to receive a text representation and produce an encoded representation of the textual content, configuring a pitch prediction module to receive the encoded representation and return an encoded pitch representation that can be modified by a user, wherein the encoded pitch representation is added to the encoded representation to produce an enhanced encoded representation, configuring a duration prediction module to receive the encoded representation and return a prediction of the number of repetitions with which each encoded representation should be updated, and configuring a decoder 1010 module to receive an updated encoded representation and return a spectral acoustic representation.

In some embodiments, the method 900 includes synthesizing the voice clone, characterized by controlled speech characteristics, by pre-processing input text 126 for formatting, normalization, phonetization, extraction of special tokens providing additional control, transforming text-to-audio by applying the voice synthesis module to the input text 126 and formatting the input text 126 converted into an audio representation, and post-processing the audio representation.

In some embodiments, the method 900 includes creating the audio-visual avatar by combining an acoustic speech recognition, dialog manager, and natural language processing for controllable avatar.

In some embodiments, the method 900 includes training and applying a refinement model to the output of the video generator 106.

FIG. 10 is a block diagram of an end-to-end model implemented for training the synthesis module and the customized synthesis module, in accordance with one implementation of the embodiment. The training for synthesizing audios and videos is achieved by different approaches. First, the end-to-end model includes a decoder 1010, a text-encoder, a duration predictor 1003, a latent encoder, and a posterior encoder 1008. According to an embodiment, the end-to-end model is trained using the GAN training approach with additional learning criteria. The end-to-end model comprises a training phase and an inference phase. In the training phase, the parameters of all parts of the model are updated. The inference phase uses the generator, text encoder 1002, duration predictor 1003 and latent encoder 1006 to generate audio in the target voice with the given text. FIG. 10 shows the training phase of the end-to-end model.

In one embodiment, the input to the end-to-end model is text, converted into characters and phonemes, and the output is audio signal. The characters or phonemes are first converted into integer values and provided to the text encoder 1002. The text encoder 1002 is configured to embed the inputs and learn an embedding for each input. A sequence of embeddings equal to the number of input characters is then propagated into a transformer architecture, which encodes local and global dependencies between input embeddings. The length regulator 1004 is configured to establish a correspondence between the lengths of the input sequence obtained from the text and the output sequence. To obtain alignments during the inference phase, the duration predictor 1003 predicts phoneme durations. A duration prediction network, included into the model, is trained to produce an alignment between the input and the output features. During the training phase, duration predictor loss is used to update parameters of duration predictor 1003.

After applying the length regulation procedure, a latent encoder 1006 is applied to the output features. The latent encoder 1006 includes multilevel transformations. These transforms include, but are not limited to, flow transforms, as well as transformer blocks. The resulting features are an intermediate latent representation. That is input to the decoder 1010 during the inference phase.

In one implementation, the posterior encoder 1008 is configured to build latent features on the input of the decoder 1010 during the training phase. For the posterior encoder 1008, the non-causal residual blocks are used. The non-casual residual block consists of layers of dilated convolutions with a gated activation unit and skip connection. The linear projection layer above the blocks produces the mean and variance of the normal posterior distribution.

According to an embodiment, during the training phase Kullback-Leibler divergence loss is used to establish a correspondence between latent encoder 1006 and posterior encoder 1008 outputs. The decoder 1010 is configured to convert latent features into an acoustic waveform. The decoder 1010 is composed of a stack of transposed convolutions, each of which is followed by a multi receptive field fusion module (MRF). The output of the MRF is the sum of the output of residual blocks that have different receptive field sizes. During the training phase, reconstruction loss is used to update the decoder parameters of the decoder 1010.

According to one embodiment, during the training phase, adversarial loss is used to improve synthesis quality. To adopt adversarial training, a discriminator 1012 is added. The discriminator 1012 distinguishes between the output generated by the decoder 1010 and the ground truth waveform. The discriminator 1012 is the multi-period discriminator 1012, which is a mixture of Markovian window-based sub-discriminator 1012, each of which operates on different periodic patterns of input waveforms.

Figure 11:
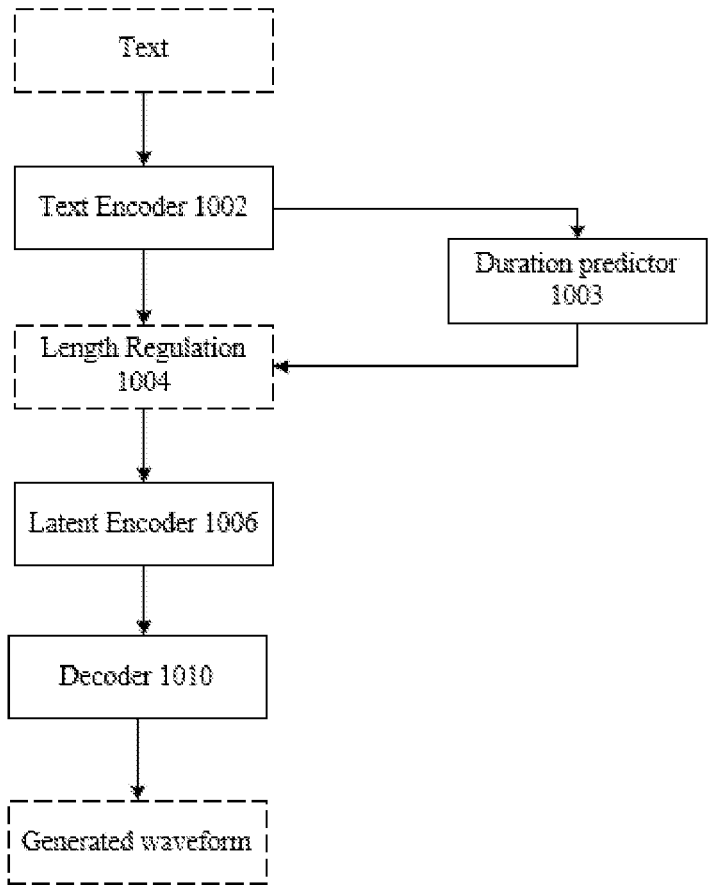
FIG. 11 depicts the inference phase of the end-to-end model, in accordance with one implementation of the present embodiment.

FIG. 11 shows the inference phase of the end-to-end model, in accordance with an embodiment. As shown in FIG. 11 and described earlier with reference to FIG. 10, the text is received as an input which is converted into smaller subunits, such as characters and phonemes. The text encoder 1002 encodes local and global dependencies between input embeddings. The length regulator 1004 is configured to establish a correspondence between the lengths of the input sequence obtained from the text and the output sequence. To obtain alignments during the inference phase, the duration predictor 1003 module predicts phoneme durations. After the length regulator 1004, a latent encoder 1006 is applied to the output features to transform the output features into the intermediate latent features. The decoder 1010 is then configured to convert the latent features into an acoustic waveform. The acoustic waveform is then utilized for audio synthesis.

FIG. 12 is a block diagram of a two-step architectural model implemented for training the synthesis module and the customized synthesis module, in accordance with one implementation of the embodiment. The two-step architecture model comprises an acoustic module 1202 and a vocoder module 1204. The acoustic module 1202 mainly comprises an encoder and a decoder 1010, receives a text divided into smaller subunits as inputs and out the acoustic features corresponding to the text.

In one implementation, the acoustic module 1202 allows modifications of the model parameters with regards to pitch, energy, speaking rate and utterance-level information. The acoustic module 1202 includes a pitch prediction model 1206, an energy prediction model 1208, an utterance encoder model 1210, a duration prediction model 1212, and a decoder 1010. The pitch prediction model 1206 receives phoneme-averaged pitch values as an input and learns to encode the pitch values into a pitch embedding through a two-layer convolutional network. The pitch embedding is then added to the encoder embedding. A mean-squared error-loss function is used to minimize the difference between predicted and target pitch values.

The energy prediction model 1208 receives the overall energy of the utterance as an input and learns to encode it into an energy embedding through a two-layer convolutional network. The energy embedding is then added to the encoder embedding. A mean squared error loss function is used to minimize the difference between predicted and target energy values.

The utterance encoder model 1210 receives the target acoustic features as input and encodes them to produce an encoding of the utterance. During generation, the acoustic features of a random sentence are input for the utterance encoder model 1210. The resulting encoding is expanded to match the input length and then added to the encoder output embeddings.

The duration prediction model 1212 is trained to produce a soft alignment between the input and the output features by using a mean squared error loss. As the acoustic module 1202 of choice is a parallel model, a hard alignment is obtained by applying the Viterbi criterion to the soft alignment and minimizing the difference between the soft and the hard alignment through a Kullback-Leibler divergence loss function. Based on the prediction of the hard alignment, the encoder output embeddings are expanded n times based on the prediction of the duration predictor 1003 for that input.

The decoder 1010 of the default architecture consists of one or more transformer layers. In one implementation, 6 transformer layers are implemented to take the expanded and enhanced encoder output embeddings and convert them into decoder 1010 output embeddings. The decoder 1010 output embedding is then put through a feedforward layer to produce n-dimensional acoustic output features. Various techniques can be implemented to minimize the difference between the target and predicted acoustic features. In one example, loss function may be utilized. The acoustic output features generated by the decoder 1010 is then provided to the vocoder module 1202.

In an embodiment, vocoder module 1202 is configured to convert acoustic features into an acoustic waveform. To accomplish this, the vocoder module 1202 is built to comprise a generator architecture and two discriminator 1012 architectures (not shown in the Figure). The generated acoustic waveforms are used to synthesize the audio recordings.

The invention claimed is:

1. A method for creating an audio-visual avatar of a target person, the method comprising:
   collecting an audio training dataset and a video training dataset;
   training a voice synthesis module to divide the audio training dataset corresponding to a plurality of audio phenomena, each audio phenomena comprising at least one pattern of an audio phrase with characteristic expression, audio phonetic symbol, or audio-dependent time code, wherein the audio training dataset comprises training audio samples not of the target person, and wherein the voice synthesis module is trained for text-to-speech comprising at least one user-modified element added to voice synthesis module embeddings;
   training a video synthesis module to divide the video training dataset into a plurality of frames corresponding to a plurality of video phenomena, each video phenomena comprising at least one pattern of a video phrase with characteristic expression, video phonetic symbol, or video-dependent time code, wherein the video training dataset comprises video samples not of the target person;
   characterizing a target person including by:
      receiving an audio sample of the target person and training a voice custom synthesis module based on the audio sample;
      receiving a video sample of the target person, wherein the video sample of the target person has been previously recorded according to a predefined video script and predefined video requirements, and
      training a video custom synthesis module based on the video sample by training a first neural network using the video sample of the target person to segment and classify body movements of the target person into a plurality of sequences corresponding to a phenomenon of the target person including fractionated torso movements characteristic of the target person for the phenomenon and fractionated head movements characteristic of the target person for the phenomenon; and
   creating an audio-visual avatar using a video generator including by:
      receiving an input text to be converted into an audio clip and synthesizing a voice clone from the text by the voice synthesis module and the voice custom synthesis module;
      processing the voice clone to be formatted by phrases and expressions;
      synthesizing a video clone based on the video synthesis module and the video custom synthesis module including:
         retrieving a body movement script comprising a predefined description for recognizing body movement sequences with associated speech,
         extracting body movement parameters from the first neural network based on the body movement script, the body movement parameters characteristic of the target person for the phenomenon,
         retrieving a face movement script comprising a predefined description for recognizing face movement sequences with associated speech,
         extracting face movement parameters from the first neural network based on the face movement script, the face movement parameters characteristic of the target person for the phenomenon,
         wherein based on recorded gestures from the video sample of the target person and a target gesture script, a preliminary video of the head of the target person is generated with controlled gestures but without lip synchronization, the target gesture script comprising a predefined description for recognizing target gesture sequences with associated speech, and
         wherein the preliminary video is compared with a voice recording of the target person to match a plurality of lip movements with words spoken by the target person in the preliminary video to perform lip synchronization; and applying the voice clone to the video clone for creating the audio-visual avatar by the video generator, the video clone including the body movement parameters characteristic of the target person for the phenomenon and the face movement parameters characteristic of the target person for the phenomenon.

2. The method of claim 1, wherein the step of synthesizing the video clone of the target person further comprises generating a head cloning and a body cloning, wherein the head cloning further comprises controlled synthesizing of lips movements and facial gestures, and wherein the body cloning further comprises hand gestures and body postures relating to the target person.

3. The method of claim 1, wherein training the voice synthesis module further comprises implementing an end-to-end model.

4. The method of claim 1, wherein training the voice synthesis module further comprises implementing a two-step model, and wherein the step of implementing the two-step model further comprises configuring an acoustic module and a vocoder module.

5. The method of claim 4, further comprising:
   receiving a text representation by an encoder module and producing an encoded representation of the textual content,
   receiving the encoded representation by a pitch prediction module and returning an encoded pitch representation that can be modified by a user, wherein the encoded pitch representation is added to the encoded representation to produce an enhanced encoded representation,
   receiving the encoded representation by a duration prediction module and returning a prediction of the number of repetitions with which each encoded representation should be upsampled, and
   receiving an upsampled encoded representation by a decoder and returning a spectral acoustic representation.

6. The method of claim 1, wherein the step of synthesizing the voice clone is characterized by controlled speech characteristics, and wherein the step of synthesizing the voice clone further comprises:
   pre-processing the input text for formatting, normalization, phonetization, extraction of special tokens;
   transforming text-to-audio by applying the voice synthesis module to the input text and formatting the input text converted into an audio representation; and
   post-processing the audio representation.

7. The method of claim 1, wherein the step of creating the audio-visual avatar further comprises combining output of an acoustic speech recognition, text-to-speech engine, dialog manager, and natural language processing for controllable avatar in one or more combinations.

8. The method of claim 1, further comprising the step of training a refinement module, and applying the trained refinement module to output of the video generator.

9. The method of claim 1, wherein applying the voice clone to the video clone further comprises:
   retrieving the target gesture script, the target gesture script further comprising a set of instructions associating a plurality of target gestures with one or more words in the audio clip;
   applying the plurality of target gestures to the audio-visual avatar during the time of occurrence of the one or more words in the audio clip.

10. The method of claim 1, wherein training the voice synthesis module further comprises applying adversarial training including adding a discriminator to distinguish between an output of the audio training dataset generated by a decoder and a ground truth waveform.

11. A system for generating an audio-visual avatar specific to an application, the system comprising:
   a processor; and instructions that, when executed by the processor, cause the processor to implement:
   a general synthesizer to receive an audio training dataset and a video training dataset comprising:
      a voice synthesis module trained by the audio training dataset to divide the audio training dataset corresponding to a plurality of audio phenomena, each audio phenomena comprising at least one pattern of an audio phrase with characteristic expression, audio phonetic symbol, or audio-dependent time code, wherein the audio training dataset comprises audio samples not of the target person and wherein the voice synthesis module is trained for text-to-speech comprising at least one user-modified element added to voice synthesis module embeddings,
      a video synthesis module trained by the video training dataset to divide the video training dataset into a plurality of frames corresponding to a plurality of video phenomena, each video phenomena comprising at least one pattern of a video phrase with characteristic expression, video phonetic symbol, or video-dependent time code, wherein the video training dataset comprises video samples not of the target person,
   a customized synthesizer, characterizing a target person, to receive an audio sample and a video sample of the target person, wherein the video sample of the target person has been previously recorded according to a predefined video script and predefined video requirements, the customized synthesizer comprising:
      a voice custom synthesis module trained on the audio sample of the target person,
      a video custom synthesis module trained on the video sample of the target person by training a first neural network using the video sample of the target person to segment and classify body movements of the target person into a plurality of sequences corresponding to a phenomenon of the target person including fractionated torso movements characteristic of the target person for the phenomenon and fractionated head movements characteristic of the target person for the phenomenon,
   a video generator to create an audio-visual avatar including by:
      receive, by a voice cloning system, an input text to be converted into an audio clip,
      synthesize a voice clone, by voice cloning system, from the input text the voice synthesis module and the voice custom synthesis module,
      process, by the voice cloning system, the voice clone to be formatted by phrases and expressions,
      synthesize a video clone, by a video cloning system, based on the video synthesis module and the video custom synthesis module including:
         retrieving a body movement script comprising a predefined description for recognizing body movement sequences with associated speech,
         extracting body movement parameters from the first neural network based on the body movement script, the body movement parameters characteristic of the target person for the phenomenon, retrieving a face movement script comprising a predefined description for recognizing face movement sequences with associated speech, extracting face movement parameters from the first neural network based on the body movement script, the face movement parameters characteristic of the target person for the phenomenon, wherein based on recorded gestures from the video sample of the target person and a target gesture script, a preliminary video of the head of the target person is generated with controlled gestures but without lip synchronization, the target gesture script comprising a predefined description for recognizing target gesture sequences with associated speech, and wherein the preliminary video is compared with a voice recording of the target person to match a plurality of lip movements with words spoken by the target person in the preliminary video to perform lip synchronization, apply the voice clone to the video clone for creating the audio-visual avatar by the video generator, the video clone including the body movement parameters characteristic of the target person for the phenomenon and the face movement parameters characteristic of the target person for the phenomenon.

12. The system of claim 11, wherein the video cloning system further comprises a head cloning system and a body cloning system, and wherein the head cloning system further comprises controlled synthesizing of lips movements and facial gestures, and wherein the body cloning system further comprises hand gestures and body postures relating to the target person.

13. The system of claim 11, wherein the general synthesizer and the customized synthesizer are trained by an end-to-end model that further comprises a generator, a discriminator, a text encoder, a duration predictor, a latent encoder, and a posterior encoder.

14. The system of claim 11, wherein the general synthesizer and the customized synthesizer are trained by a two-step model including an acoustic module and a vocoder module, and wherein the acoustic module and the vocoder module can be trained together or independently.

15. The system of claim 14, wherein the acoustic module comprises:

an encoder module to receive a text representation and produce an encoded representation of the textual content;

a pitch prediction module to receive the encoded representation and return an encoded pitch representation that can be modified by a user, wherein the encoded pitch representation is added to the encoded representation to produce an enhanced encoded representation;

a duration prediction module to receive the encoded representation and return a prediction of the number of repetitions with which each encoded representation should be upsampled; and a decoder to receive an upsampled encoded representation and return a spectral acoustic representation.

16. The system of claim 11, wherein the voice cloning system, characterized by controlled speech characteristics, is configured to:

pre-process the input text for formatting, normalization, phonetization, extraction of special tokens providing additional control;

transform text-to-audio by applying the voice synthesis module to the input text and formatting the input text converted into an audio representation; and post-process the audio representation.

17. The system of claim 11, wherein the video generator further comprises combining an acoustic speech recognition, dialog manager, text-to-speech engine, and natural language processing for a controllable avatar.

18. The system of claim 11, wherein the instructions cause the processor to further implement a refinement module applied to output of the video generator.

19. The system of claim 11, wherein the target gesture script comprises a set of instructions associating a plurality of target gestures with one or more words in the audio clip, wherein the video generator creates the audio-visual avatar by applying the plurality of target gestures to the audio-visual avatar during the time of occurrence of the one or more words in the audio clip.

20. The system of claim 11, wherein the voice synthesis module trained by the audio training dataset is further trained by applying adversarial training including adding a discriminator to distinguish between an output of the audio training dataset generated by a decoder and a ground truth waveform.

* * * * *